United States Patent [19]
Van Horlick

[11] Patent Number: 5,222,563
[45] Date of Patent: Jun. 29, 1993

[54] MULCHING APPARATUS

[75] Inventor: Timothy C. Van Horlick, Lillooet, Canada

[73] Assignee: West-Northwest Forestry Ltd., Canada

[21] Appl. No.: 709,617

[22] Filed: Jun. 3, 1991

[51] Int. Cl.⁵ .............................................. A01B 33/06
[52] U.S. Cl. ...................................... 172/111; 172/25; 172/35; 74/421 A
[58] Field of Search ..................... 172/25, 59, 35, 36, 172/110, 111, 91, 98, 99, 522, 523; 37/189; 175/398, 397; 56/11.9, 11.8, DIG. 6, DIG. 11; 74/421 A

[56] References Cited

U.S. PATENT DOCUMENTS

| | | |
|---|---|---|
| 2,755,718 | 7/1956 | Arndt ................................. 172/111 |
| 2,791,953 | 5/1957 | Erickson et al. ...................... 172/98 |
| 3,129,772 | 4/1964 | Anderson ............................ 172/111 |
| 3,539,014 | 11/1970 | Jonsson ............................... 172/111 |
| 3,561,540 | 2/1971 | Kaszkurewicz . | |
| 3,938,249 | 2/1976 | Chacon .................................. 172/25 |
| 4,287,955 | 9/1981 | Anderson . | |
| 4,332,299 | 6/1982 | Parks et al. . | |
| 4,363,362 | 12/1982 | Barato ................................... 172/59 |
| 4,570,721 | 2/1986 | Mentele . | |
| 4,612,715 | 9/1986 | Carther ................................. 172/98 |
| 4,854,404 | 8/1989 | Weber et al. . | |
| 4,936,390 | 6/1990 | Anderson et al. . | |

FOREIGN PATENT DOCUMENTS

| | | | |
|---|---|---|---|
| 1045698 | 5/1957 | Fed. Rep. of Germany ........ 172/59 |
| 793432 | 1/1981 | U.S.S.R. ............................. 172/111 |
| 1099860 | 6/1984 | U.S.S.R. ............................. 172/523 |

Primary Examiner—Randolph A. Reese
Assistant Examiner—Spencer Warnick
Attorney, Agent, or Firm—Barrigar & Oyen

[57] ABSTRACT

Mulching apparatus having a tapered tooth structure which prepares a planting spot such that, when the apparatus is withdrawn from the ground, mulched residue remains within or adjacent to the planting spot. The apparatus may be removably attached to the boom of an excavator type vehicle and drivingly coupled to the vehicle's hydraulic drive system. The machine operator actuates and manoeuvres the vehicle, boom and mulching apparatus to rapidly prepare a series of mulch-containing planting spots for planting seeds or seedlings, for example in large scale reforestation projects.

16 Claims, 5 Drawing Sheets

MULCHING APPARATUS

FIELD OF THE INVENTION

This application pertains to manipulable, powered apparatus for rapidly mulching the ground to facilitate tree planting or seeding in large scale reforestation projects.

BACKGROUND OF THE INVENTION

Reforestation projects often involve hand planting of seedlings. At one time, reforestation workers used tools called "mattocks" to plant seedlings. The mattock's blade was driven into the ground and used to pry a "V" shaped hole in the ground. A seedling was dropped into the hole and the mattock's blade then removed, allowing the ground to close around the seedling's roots. Because the mattock merely sliced a narrow hole in the ground, without loosening the surrounding earth, the seedling's roots were often unable to develop. Accordingly, relatively large numbers of seedlings planted with the aid of mattocks failed to mature into trees.

More recently, reforestation workers have used shovels to plant seedlings. The shovel is used to prepare a planting spot of reasonable size by exposing the soil and loosening or breaking it up to a suitable depth. Seedlings planted in such prepared planting spots are more likely to take root and mature into trees. However, preparation of such planting spots requires comparatively expensive, time-consuming manual labour and is accordingly unsuitable for large scale reforestation projects.

The present invention provides a mulching apparatus which may be mounted at the end of the boom of an excavator type vehicle. The machine operator actuates and manoeuvres the vehicle, boom and mulching apparatus to rapidly prepare a large number of planting spots in which seeds or seedlings may be planted. Teeth provided on the mulching apparatus expose and break up the soil, together with any organic material therein such that, when the mulching apparatus is withdrawn from the ground, a mulched residue remains within or adjacent to the periphery of the resultant planting spot. Seeds or seedlings are deposited in the prepared planting spot. The mulched residue can be readily placed over the seeds, or over the seedlings' roots.

The prior art has provided a variety of powered devices for tree planting and the like. For example, U.S. Pat. No. 3,561,540 issued 9 February, 1971 for an invention of Kaszkurewicz discloses a device for planting trees or the like. Unlike the present invention, Kaszkurewicz' device does not prepare a mulch-containing planting spot. By contrast, Kaszkurewicz' device comes into operation only after the tree or other item to be planted has been deposited into a hole dug by other apparatus. Kaszkurewicz' device is lowered over the top of the item and rotated. Blades on the device move soil from the area surrounding the previously dug hole and deflect that soil into the hole atop the item's roots, in such a manner that an annular trench is created in the soil around the periphery of the planted item.

U.S. Pat. No. 4,287,955 issued 8 Sep., 1981 for an invention of Anderson provides a rotary tilling device capable of attachment to a manipulable vehicle boom through which driving power is supplied to the device. A series of downwardly depending teeth are arranged around the periphery of a rotatable drive plate provided at the end of the boom. Anderson's device tills the soil between cultivated plants. The configuration of Anderson's teeth is such that it is unlikely that his device would provide a practical means of preparing a mulch-containing planting spot, as the present invention does.

U.S. Pat. No. 4,332,299 issued 1 Jun., 1982 for an invention of Parks et al. provides another type of cultivator device comparable to that of Anderson. Again, the object appears to be to till the earth between or near cultivated plants; not to facilitate planting or mulching operations. In particular, like Anderson, Parks et al. provide teeth around the periphery of a rotatably driven base plate. However, the teeth do not appear to be configured in such a manner that they would provide a practical means of preparing a mulch-containing planting spot.

U.S. Pat. No. 4,570,721 issued 18 Feb., 1986 for an invention of Mentele provides a device for use in certain weeding operations. A series of downwardly depending teeth are provided around the lower underside of a rotatable drive plate. The ends of the teeth are curved somewhat inwardly. However, the curvature does not appear to be sufficient to ensure that the Mentele device would prepare a mulch-containing planting spot if the rotating teeth were forced vertically downwardly into the earth. It seems that the teeth would merely cut an annular hole into the earth, leaving a solid cylindrical core in the centre of the hole. This is unsuitable for tree planting operations of the sort contemplated by the present inventor.

U.S. Pat. No. 4,854,404 issued 8 Aug., 1989 for an invention of Weber et al. provides a tucket auger for excavating holes for tree transplantation. One embodiment of the Weber et al. device employs spaced arrays of vertically aligned teeth which are arranged at intervals around the outer surface of a rotatable, funnel-shaped member. The rotating device is driven into the ground. The teeth dig a hole in the ground and force the removed dirt through slots into the interior of the funnel. The device, with its contained dirt, is then removed from the ground, leaving a hole to receive a tree. The funnel may then be opened in clam-shell fashion to dump the contained dirt back onto the tree's root ball. The present invention avoids the mechanical complexity of the Weber et al. device by simultaneously preparing a planting spot and leaving mulched residue within or adjacent to the periphery of that spot.

U.S. Pat. No. 4,936,390 issued 26 Jun., 1990 for an invention of Anderson et al. provides another type of device for tilling the soil around cultivated plants. Again, a series of downwardly projecting teeth are provided around the circumference of a rotatable base plate. The configuration of the teeth is such that it is unlikely that this device could constitute a practical mechanism for preparing a mulch-containing planting spot, as is accomplished by the present invention.

SUMMARY OF THE INVENTION

In accordance with one embodiment, the invention provides mulching apparatus, comprising a rotatable base plate, a first pair of horizontally spaced tooth supports projecting substantially vertically downwardly from the base plate, inwardly tapered cutting teeth projecting from the lower ends of each of the supports, and drive means for drivingly rotating the base plate.

In accordance with another embodiment, the invention provides mulching apparatus, comprising a rotatable base plate, a first pair of horizontally spaced tooth supports projecting substantially vertically downwardly from the base plate, a second pair of horizontally spaced tooth supports disposed outwardly of and transversely to the first pair of supports and projecting substantially vertically downwardly from the base plate to a depth less than the projection depth of the first supports, cutting teeth fixed to the lower ends of each of the supports, and drive means for drivingly rotating the base plate.

In either embodiment, a turn table is provided for removably supporting the base plate. The turn table preferably has at least one pair of peripheral tooth supports projecting substantially vertically downwardly from horizontally opposed sides of the turn table. A second pair of peripheral tooth supports may be disposed transversely to the aforesaid pair of peripheral supports and project substantially vertically downwardly from the turn table from horizontally opposed sides of the turn table. The peripheral tooth supports project downwardly from the turn table to a depth substantially less than the projection depth of the first or second tooth supports. Advantageously, the second pair of peripheral tooth supports is disposed outwardly of the first pair of peripheral tooth supports and projects downwardly from the turn table to a depth less than the projection depth of the first pair of peripheral tooth supports.

DETAILED DESCRIPTION OF THE PREFERRED EMBODIMENT

Figure 1:
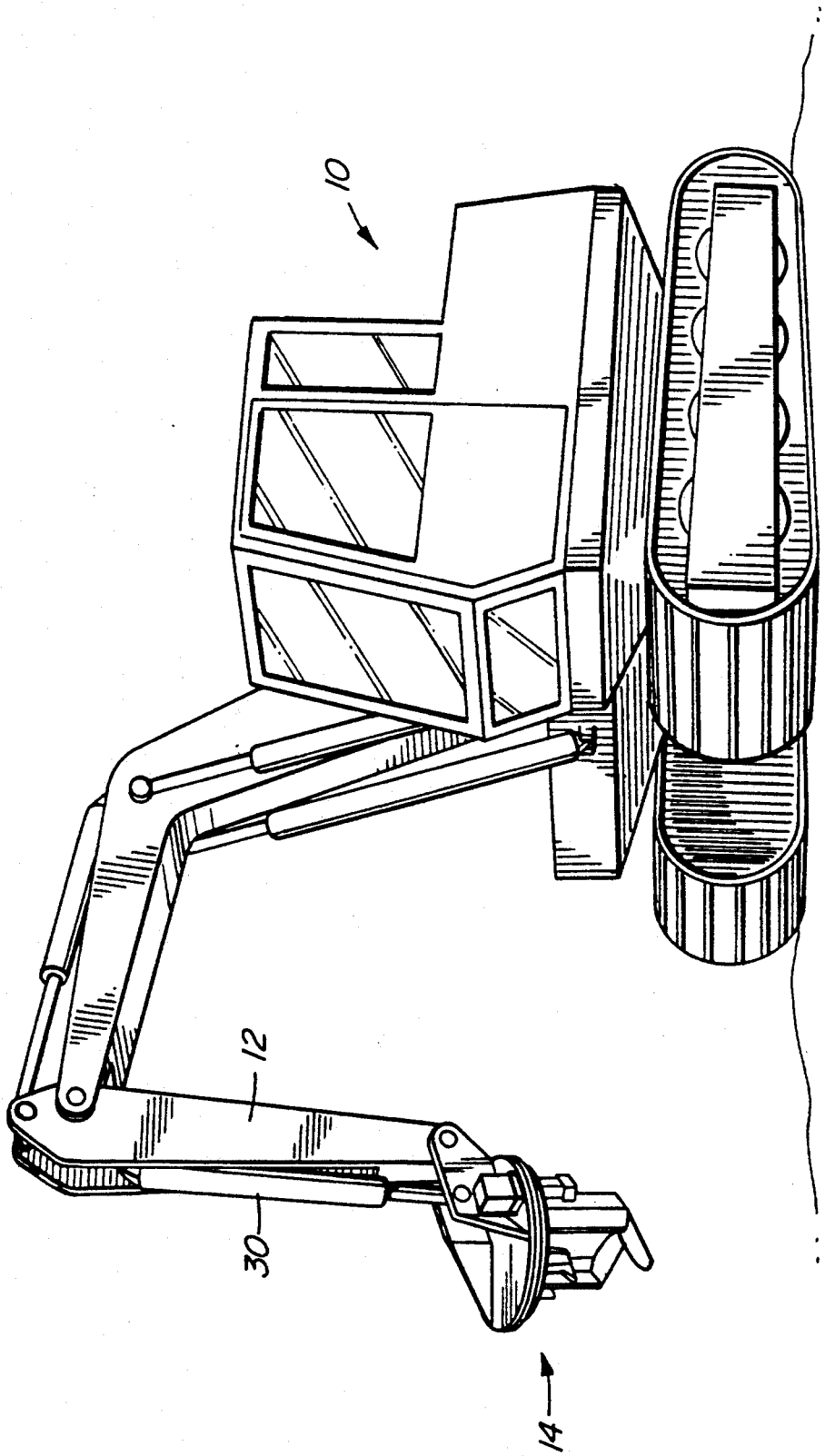
FIG. 1 is a pictorial illustration of an excavator type vehicle having a boom to which mulching apparatus of the type exemplified by the invention is coupled.

FIG. 1 illustrates a powered excavator type vehicle 10 having a manipulable boom 12 to which mulching apparatus 14 is removably coupled. Suitable hydraulic connections are provided between boom 12 and mulching apparatus 14 to power hydraulic motor 16 (FIG. 2) which is incorporated in mulching apparatus 14.

Figure 2:
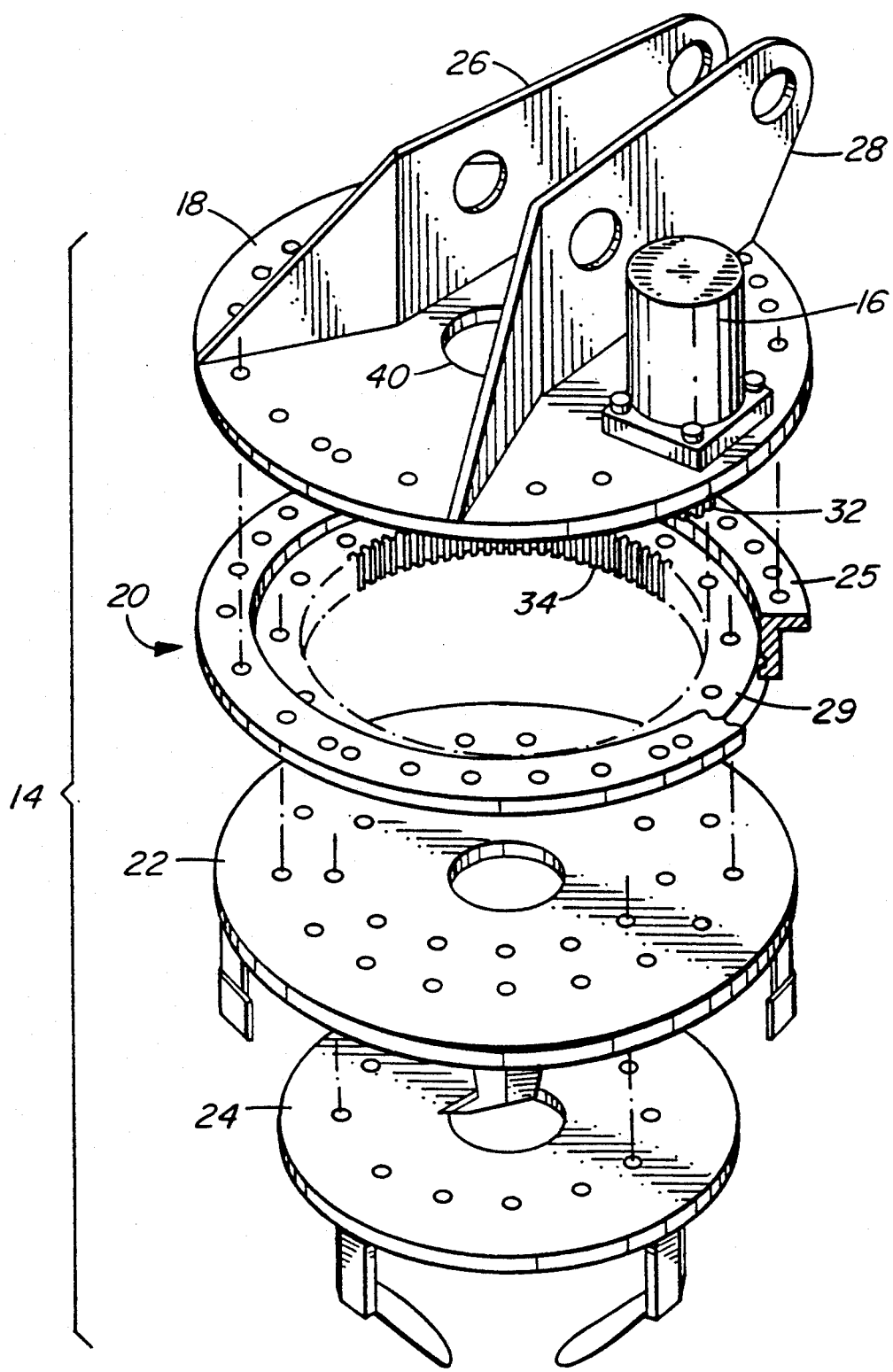
FIG. 2 is an exploded pictorial illustration of mulching apparatus constructed in accordance with one embodiment of the invention.
Figure 5:
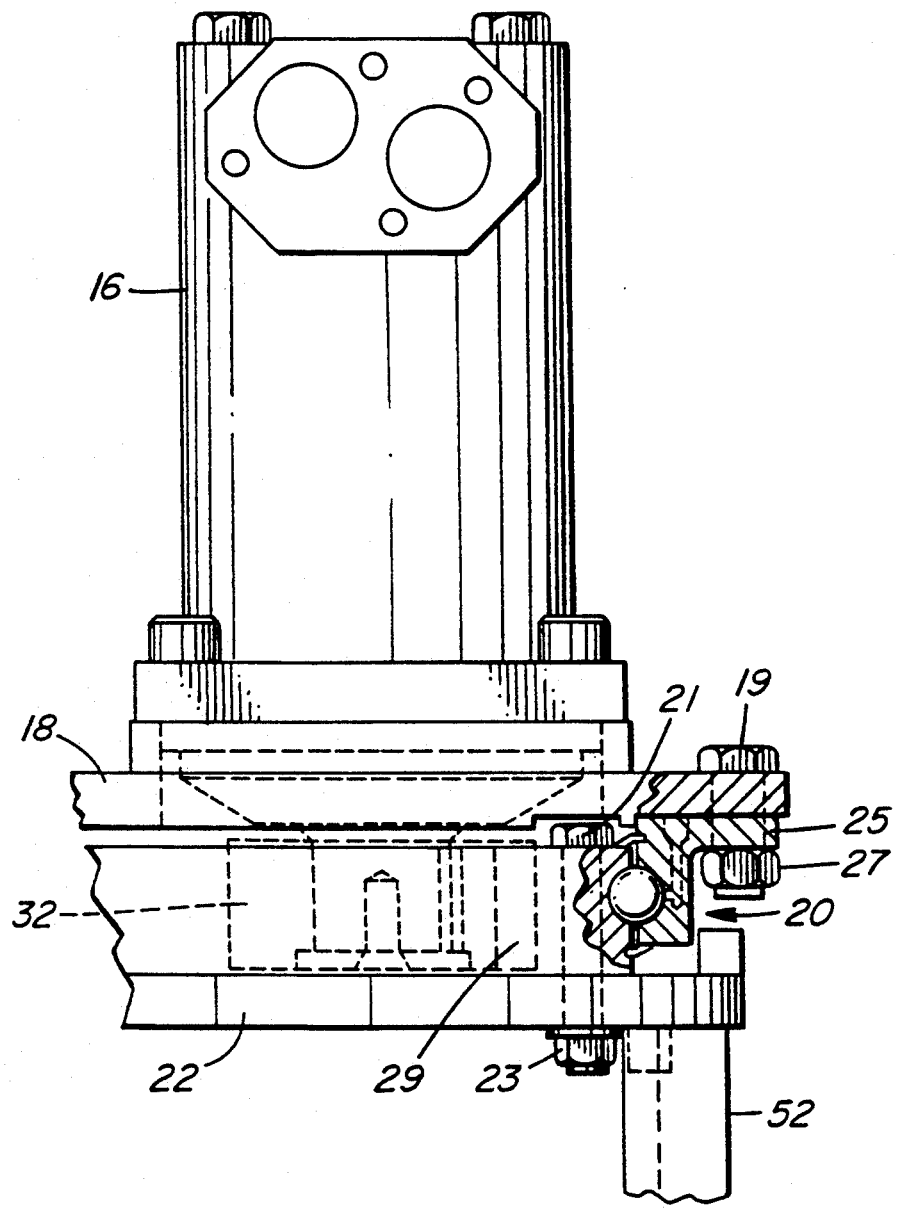
FIG. 5 is an enlarged side elevation view of the outer portion of the apparatus depicted in either of FIGS. 3B or 4B, showing details of the rotary drive mechanism.

As depicted in FIG. 2, the major components of mulching apparatus 14 include mounting plate 18, split bearing ring 20, turn table 22 and interchangeable mulching head 24. Suitable coupling members 26, 28 are provided on mounting plate 18 for attachment to boom 12 and hydraulic tilt cylinder 30 (FIG. 1). Bolts 19 (only one of which is shown in FIG. 5) are passed through apertures provided around the circumference of each of mounting plate 18 and the outer, fixed half 25 of bearing ring 20. Nuts 27 (only one of which is shown in FIG. 5) are threadably tightened over the ends of the respective bolts to fasten mounting plate 18 and fixed bearing half 25 together. Another set of bolts 21 (only one of which is shown in FIG. 5) are passed through apertures provided around the circumference of the rotatable inner half 29 of bearing ring 20 and turn table 22. Nuts 23 (only one of which is shown in FIG. 5) are threadably tightened over the ends of the respective bolts to fasten the inner half 29 of bearing ring 20 and turn table 22 together. The drive shaft of motor 16 protrudes through mounting plate 18. Drive gear 32 is fixed to the motor's drive shaft to drivingly engage mating teeth 34 provided around the inner circumference of bearing half 29 in order to rotate bearing half 29 relative to fixed bearing half 25. A separate series of nuts and bolts (not shown) are used to removably attach mulching head 24 to the bottom of turn table 22.

Figure 3A:
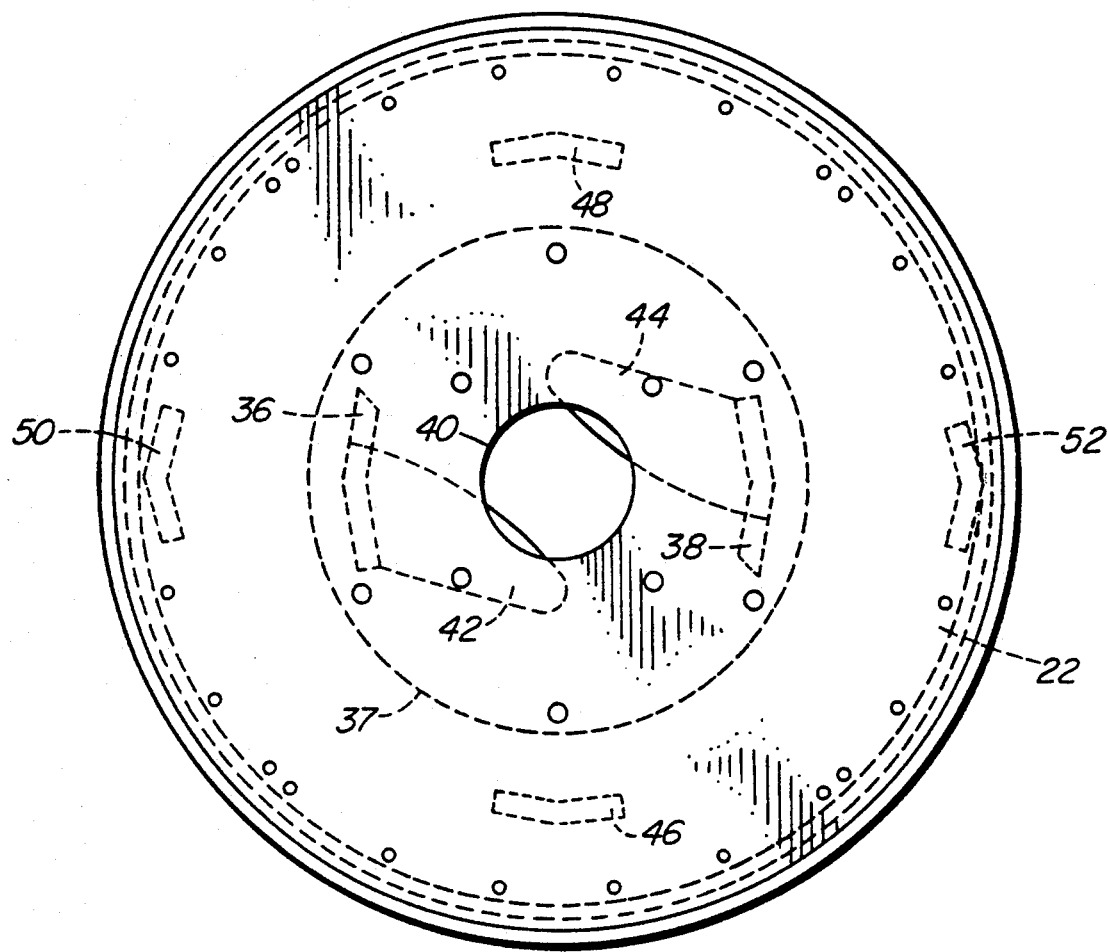
FIG. 3A is a top plan view of mulching apparatus constructed in accordance with one embodiment of the invention.
Figure 3B:
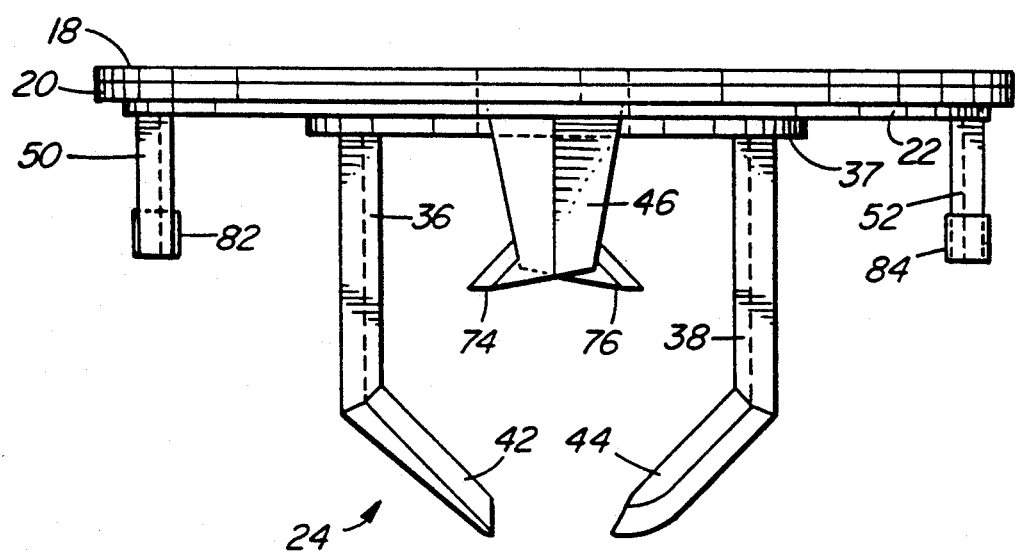
FIG. 3B is a side elevation view of the mulching apparatus of FIG. 3A.
Figure 4A:
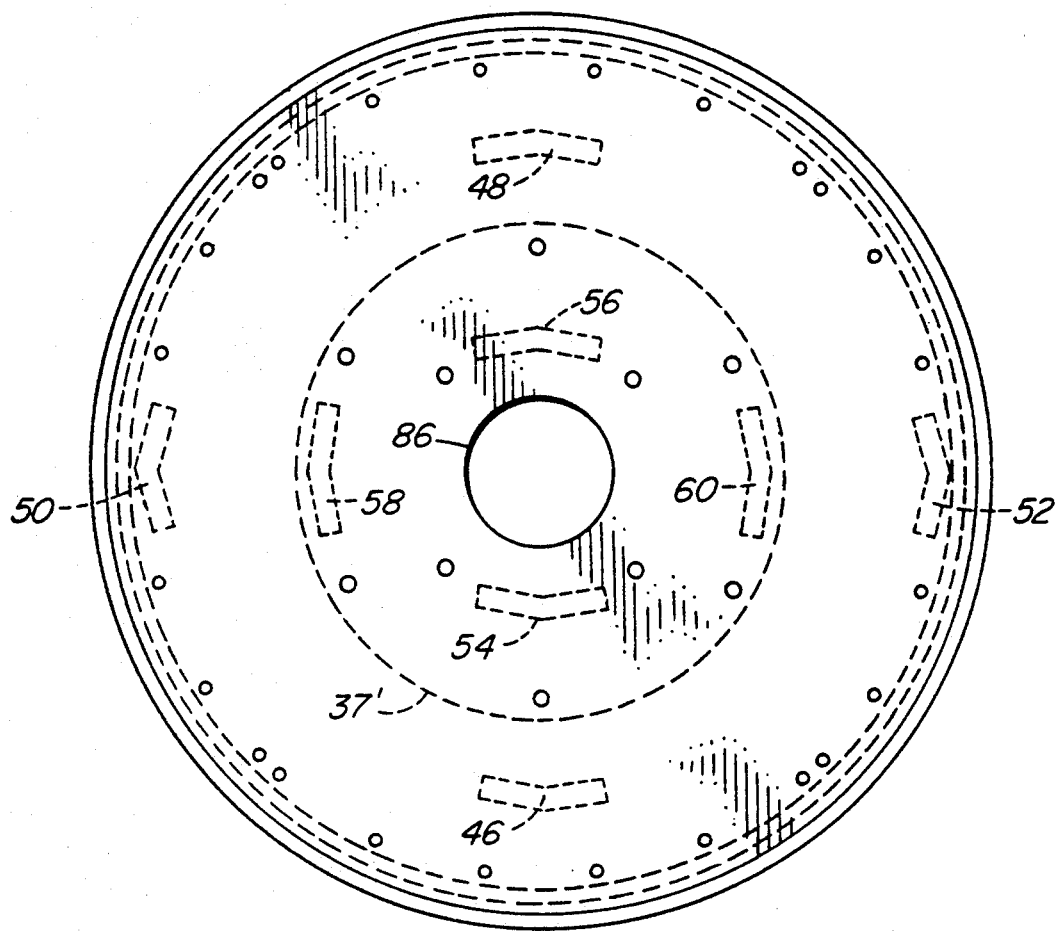
FIG. 4A is a top plan view of mulching apparatus constructed in accordance with another embodiment of the invention.
Figure 4B:
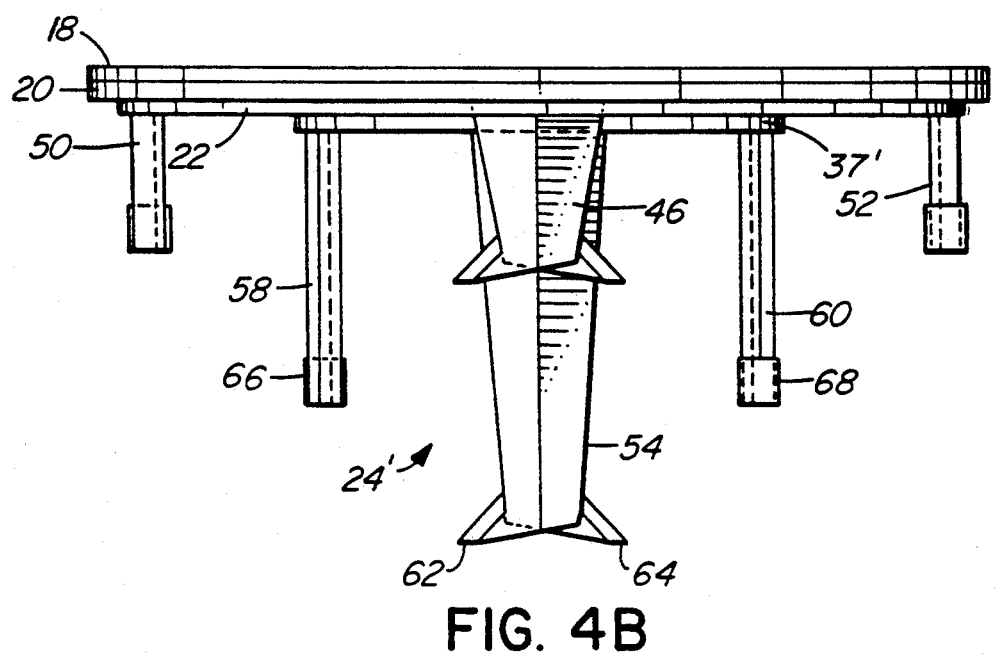
FIG. 4B is a side elevation view of the mulching apparatus depicted in FIG. 4A.

There are two basic embodiments of the mulching head. The first embodiment 24 is depicted in FIGS. 3A and 3B. The second embodiment 24' is depicted in FIGS. 4A and 4B. First embodiment 24 is adapted for use in wet ground. Second embodiment 24' is adapted for use in dry or frozen ground.

Considering first the wet ground embodiment 24 of FIGS. 3A and 3B, a pair of tooth supports 36, 38 project substantially vertically downwardly from base plate 37. Tooth supports 36, 38 are horizontally separated from one another so as to leave the central region 40 of base plate 37 substantially free of obstruction for reasons hereinafter explained. Inwardly tapered cutting teeth 42, 44 project from the lower ends of each of tooth supports 36, 38. As will best be understood with reference to FIG. 3A, teeth 42, 44 traverse overlapping swaths when base plate 37 is drivingly rotated as hereinafter explained. However, teeth 42, 44 are configured to leave the central region 40 of base plate 37 substantially free of obstruction as aforesaid.

At least one pair of peripheral tooth supports 46, 48 project substantially vertically downwardly from points around the underside of turn table 22. If desired, a second pair of peripheral tooth supports 50, 52 may be provided. The peripheral tooth supports are preferably paired as depicted in FIGS. 3A and 3B, with supports 46, 48 mounted on horizontally opposed sides of turn table 22; and, supports 50, 52 mounted in horizontal opposition to one another and disposed transversely to supports 46, 48. It will be noted that the peripheral tooth supports project downwardly from turn table 22 to a depth which is significantly less than the projection depth of tooth supports 36, 8; that peripheral support pair 50, 52 is disposed outwardly of pair 46, 48; and, that peripheral supports 50, 52 project downwardly from turn table 22 to a depth less than the projection depth of supports 46, 48. This yields a tapered cutting action as hereinafter explained. Cutting teeth 74, 76, 82, 84 are fixed to the respective lower ends of peripheral supports 46, 48, 50, 52.

The dry or frozen ground second embodiment 24' depicted in FIGS. 4A and 4B incorporates a base plate 37' identical to base plate 37 depicted in FIGS. 3A and 3B. In the embodiment of FIGS. 4A and 4B, a first pair of horizontally spaced tooth supports 54, 56 project substantially vertically downwardly from base plate 37'. A second pair of horizontally spaced tooth supports 58, 60 are disposed outwardly of and transversely to supports 54, 56. The second pair of supports 58, 60 project substantially vertically downwardly from base plate 37' to a depth which is less than the projection depth of first supports 54, 56. This difference in projection depths is best seen in FIG. 4B. Cutting teeth 62, 64, 66, 68 are fixed to the lower ends of each of supports 54, 56, 58 and 60 respectively.

Second embodiment 24' may be mounted on the same turn table 22 as is employed for the first embodiment (i.e. either one of the first or the second embodiments may be interchangeably coupled to the underside of turn table 22, depending upon the condition of the ground in which planting spots are to be prepared). Peripheral tooth supports 46, 48, 50, 52 together with the second embodiment's tooth supports 54, 56, 58 and 60 define a tapered configuration. For example, as previously noted, the outermost peripheral support pair 50, 52 projects downwardly from turn table 22 to a depth less than the projection depth of the inner peripheral support pair 46, 48. All of the peripheral tooth supports project downwardly from turn table 22 to a depth which is less than the projection depth of the shortest tooth supports provided on base plate 37' (i.e. outer, second supports 58, 60). Second supports 58, 60 project downwardly to a depth which is in turn less than the projection depth of the first, inner pair of supports 54, 56. It will also be noted that first and second supports 54, 56 and 58, 60 are horizontally spaced to leave an unobstructed region 86 on base plate 37' for the reasons hereinafter explained.

In operation, the base assembly consisting of mounting plate 18, bearing ring 20 and turn table 22 is coupled to the end of manipulable boom 12. A mulching head constructed in accordance with either of the embodiments depicted in FIGS. 3A and 3B; or, 4A and 4B is selected in accordance with the condition of the ground in which planting spots are to be prepared and coupled to turn table 22. The vehicle operator manoeuvres vehicle 10 and boom 12 to position the mulching head over a piece of ground in which one or more planting spots are to be prepared. Tilt cylinder 30 is adjusted so that mounting plate 18 is substantially parallel to the ground. Drive motor 16 is actuated to drivingly rotate the inner half 29 of bearing ring 20, which in turn rotates turn table 22 and the mulching head. The operator then manipulates boom 12 to force the mulching head vertically downwardly.

The mulching head's teeth dig an inwardly tapered planting spot as they penetrate the ground. The tapered tooth configuration aforesaid is such that the teeth do not remove a significant amount of dirt from the planting spot. Instead, the dirt and any organic material therein is broken up into fine pieces and mixed together (i.e. mulched) by the rotating teeth. When the operator manipulates boom 12 to withdraw the mulching head from the planting spot, a mound of mulched organic material remains within or adjacent to the outer periphery of the planting spot. The operator may then further manipulate boom 12 and the mulching head to mound, level or depress the mulched material, depending upon the condition of the ground in which planting spots are to be prepared and the preferred planting technique.

The invention facilitates rapid preparation of a large number of planting spots which offer superior plant growth potential. For example, while digging the planting spot, the mulching head destroys materials overlying the planting spot such as brush, grass, scrub, weeds, logging slash, etc. which could otherwise inhibit the growth of seeds or seedlings planted within the planting spot by competing with them for sunlight, nutrients, moisture, etc. The mixed, mulched organic material created by the mulching head provides fertilizer for seeds or seedlings planted within the planting spot. The vigorous rotary digging action of the mulching head's teeth warms the mulched material somewhat and improves its ability to resist frost, which can improve the survival potential of seeds or seedlings planted within the planting spot. The large volume of mixed, mulched organic material created by the mulching head enhances water penetration and retention in the region surrounding the seeds or seedlings.

The shape of the individual teeth is not crucial. The tapered configuration of the teeth and their horizontal spacing described above is of more concern. The total number of teeth is also not critical. For example, with reference to embodiment 24' of FIGS. 4A and 4B, supports 58, 60 and teeth 66, 68 fixed thereto could be omitted. In either embodiment, additional teeth could be employed if desired. Any additional teeth should be configured in similar fashion to those described above. That is, the teeth should be horizontally spaced to leave the central region 40 of the base plate free of obstruction, and they should conform to the tapered configuration aforesaid.

The speed at which the mulching head is rotatably driven is not critical. Rotational drive speeds of about 15 rpm to 60 rpm are suitable, with a drive speed of about 40 rpm being preferred.

The diameter of the mulching head may be varied to suit the planting conditions (i.e. depending upon the diameter of the planting spot required). More particularly, base plate 37 (or 37') may have a diameter in the range of about 1 foot to about 6 feet. Similarly, the penetration depths of the various teeth may be varied to suit the planting conditions. In typical reforestation projects a penetration depth of about 18 inches is preferred.

As previously mentioned, a region (designated 40 in FIG. 3A, and 86 in FIG. 4A) is preferably left unobstructed. This facilitates the provision of an aperture through mounting plate 18, turn table 22 and base plate 37 (or 37'). A seeding device (not shown) may be coupled atop base plate 18 to deposit seeds, herbicides and/or fertilizer directly through the mulching head into the planting spot.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:
1. Mulching apparatus, comprising:
    (a) a rotatable base plate;
    (b) a turn table for removably supporting said base plate;
    (c) a first pair of horizontally spaced tooth supports projecting substantially vertically downwardly from said base plate;
    (d) inwardly tapered cutting teeth projecting from the lower ends of each of said supports;
    (e) at least one pair of peripheral tooth supports projecting substantially vertically downwardly form horizontally opposed sides of said turn table; and,
    (f) drive means for drivingly rotating said base plate.
2. Mulching apparatus as defined in claim 1, further comprising a second pair of peripheral tooth supports disposed transversely to said one pair of peripheral supports and projecting substantially vertically down- wardly from said turn table from horizontally opposed sides of said turn table.

3. Mulching apparatus as defined in claim 2, wherein said peripheral tooth supports project downwardly from said tun table to a depth substantially less than the projection depth of said first pair of tooth supports.

4. Mulching apparatus as defined in claim 3, wherein said second pair of peripheral tooth supports is disposed outwardly of said first pair of peripheral tooth supports and projects downwardly from said turn table to a depth less than the projection depth of said first pair of peripheral tooth supports.

5. Mulching apparatus as defined in claim 1, wherein said base plate and said turn table are pierced by centrally located, concentrically aligned apertures.

6. Mulching apparatus as defined in claim 3, wherein said drive means rotates said base plate at a speed of about 15 rpm to about 60 rpm.

7. Mulching apparatus as defined in claim 3, wherein said base plate has a diameter of about 1' to about 6'.

8. Mulching apparatus, comprising:
 (a) a rotatable base plate;
 (b) a first pair of horizontally spaced tooth supports projecting substantially vertically downwardly from said base plate;
 (c) a second pair of horizontally spaced tooth supports disposed outwardly of and transversely to said first pair of supports and projecting substantially vertically downwardly from said base plate to a depth less than the projection depth of said first supports;
 (d) cutting teeth fixed to the lower ends of each of said supports; and,
 (e) drive means for drivingly rotating said base plate.

9. Mulching apparatus as defined in claim 8, further comprising a turn table for removably supporting said base plate.

10. Mulching apparatus as defined in claim 9, wherein said turn table further comprises at least one pair of peripheral tooth supports projecting substantially vertically downwardly from horizontally opposed sides of said turn table.

11. Mulching apparatus as defined in claim 10, further comprising a second pair of peripheral tooth supports disposed transversely to said one pair of peripheral supports and projecting substantially vertically downwardly from said turn table from horizontally opposed sides of said turn table.

12. Mulching apparatus as defined in claim 11, wherein said peripheral tooth supports project downwardly from said turn table to a depth substantially less than the projection depth of said second pair of tooth supports.

13. Mulching apparatus as defined in claim 12, wherein aid second pair of peripheral tooth supports is disposed outwardly of said first pair of peripheral tooth supports and projects downwardly from said turn table to a depth less than the projection depth of said first pair of peripheral tooth supports.

14. Mulching apparatus as defined in claim 9, wherein said base plate and said turn table are pierced by centrally located, concentrically aligned apertures.

15. Mulching apparatus as defined in claim 12, wherein said drive means rotates said base plate at a speed of about 15 rpm to about 60 rpm.

16. Mulching apparatus as defined in claim 12, wherein said base plate has a diameter of about 1' to about 6'.

* * * * *